United States Patent [19]

Steadings et al.

[11] Patent Number: 5,348,317
[45] Date of Patent: Sep. 20, 1994

[54] CHUCK

[75] Inventors: Stephen W. Steadings; Christopher B. Barton, both of Seneca, S.C.

[73] Assignee: Jacobs Chuck Technology Corporation, Wilmington, Del.

[21] Appl. No.: 106,063

[22] Filed: Aug. 13, 1993

[51] Int. Cl.$^5$ ............................................. B23B 13/12
[52] U.S. Cl. ...................................... 279/62; 279/902
[58] Field of Search ................................. 279/60–65, 279/902

[56] References Cited

U.S. PATENT DOCUMENTS

| | | |
|---|---|---|
| 897,335 | 9/1908 | Almond . |
| 911,012 | 1/1909 | Jacobs . |
| 1,123,541 | 1/1915 | Jacobs . |
| 1,526,328 | 2/1925 | Englund . |
| 2,292,470 | 8/1942 | Östberg . |
| 2,684,856 | 7/1954 | Stoner . |
| 3,589,486 | 6/1971 | Kelch . |
| 3,813,827 | 6/1974 | Bloch . |
| 3,927,892 | 12/1975 | Pradota . |
| 4,252,333 | 2/1981 | Vogel . |
| 4,275,893 | 6/1981 | Bilanceri . |
| 4,305,597 | 12/1981 | McCarty . |
| 4,423,881 | 1/1984 | Whitehead . |
| 4,460,296 | 7/1984 | Sivertson, Jr. . |
| 4,575,108 | 3/1986 | Whitehead . |
| 4,648,608 | 3/1987 | Smith . |
| 4,660,841 | 4/1987 | Chouinard . |
| 4,664,394 | 5/1987 | Theissig et al. . |
| 4,682,918 | 7/1987 | Palm . |
| 4,695,065 | 9/1987 | Komatsu et al. . |
| 4,702,122 | 10/1987 | Richard . |
| 4,817,971 | 4/1989 | Flynn . |
| 4,840,387 | 6/1989 | McCarthy . |
| 4,842,288 | 6/1989 | Ando . |
| 4,951,955 | 8/1990 | Sakamaki . |
| 5,009,439 | 4/1991 | Sakamaki ................. 408/240 X |
| 5,125,673 | 6/1992 | Huff et al. . |
| 5,253,879 | 10/1993 | Huff et al. . |

FOREIGN PATENT DOCUMENTS

| | | |
|---|---|---|
| 3439668A | 4/1986 | Fed. Rep. of Germany . |
| 63-216604 | 9/1988 | Japan . |
| 8903267 | 10/1988 | Japan . |
| 661643 | 11/1951 | United Kingdom . |

OTHER PUBLICATIONS

Yukiwa Products Brochure.
Bosch Catalog No. 890,021, Sep., 1990, pp. 15 and 17.

*Primary Examiner*—Steven C. Bishop
*Attorney, Agent, or Firm*—Dority & Manning

[57] ABSTRACT

Chuck for use with a manual or powered driver including a nut rotatably mounted on the chuck body and in engagement with the threads of the chuck jaws. The chuck includes a self-contained anti-friction bearing assembly disposed between the nut and a thrust ring, as well as a generally cylindrical front sleeve member in driving engagement with the nut and overlying a nose section of the body of the chuck so that when the front sleeve member is rotated with respect to the body member, the jaws will be moved thereby. The chuck also includes a rust resistant decorative nosepiece.

31 Claims, 2 Drawing Sheets

CHUCK

BACKGROUND OF THE INVENTION

The present invention relates generally to chucks for use with drills or with electric or pneumatic power drivers. More particularly, the present invention relates to a chuck of the keyless type which may be tightened or loosened by hand or by actuation of the driver motor.

Both hand and electric or pneumatic tool drivers are well known. Although twist drills are the most common tools used with such drivers, the tools may also comprise screwdrivers, nut drivers, burrs, mounted grinding stones and other cutting or abrading tools. Since the tools may have shanks of varying diameter or the cross-section of the tool shank may be polygonal, the device is usually provided with a chuck which is adjustable over a relatively wide range. The chuck may be attached to the driver by a threaded or tapered bore.

A wide variety of chucks have been developed in the art. In the simplest form of chuck, three jaws spaced circumferentially approximately 120 degrees apart from each other are constrained by angularly disposed passageways in a body attached onto the drive shaft and configured so that rotation of the body in one direction relative to a constrained nut engaging the jaws forces the jaws into gripping relationship with respect to the cylindrical shank of a tool, while rotation in the opposite direction releases the gripping relationship. Such a chuck may be keyless if it is rotated by hand. One example of such a chuck is disclosed in U.S. Pat. No. 5,125,673 entitled "Non-Impact Keyless Chuck" commonly assigned to the present assignee, and whose entire disclosure is incorporated by reference herein.

Despite the success of keyless chucks such as set forth in U.S. Pat. No. 5,125,673, varying configurations of chucks are desirable for a variety of applications. Currently utilized in a variety of chuck applications are ball bearings for reducing friction between the nut and body from axial thrust of the nut onto the body. These bearings are sometimes caged and have separate top and bottom thrust races. Sometimes the body or the nut, if hard enough, can serve as the bottom or top thrust race, respectively. It would be desirable to have a keyless chuck that requires fewer components or lower manufacturing or assembly cost. In addition, it would be desirable to have a chuck configuration whereby radial as well as axial thread stresses were minimized when the chuck was operated. Further, it would be desirable to have a chuck whereby the front sleeve is maintained in place by a nosepiece that is both functional and serves an aesthetic purpose.

SUMMARY OF THE INVENTION

The present invention recognizes and addresses the foregoing considerations, and others of prior art constructions and methods.

Accordingly, it is an object of the present invention to provide an improved chuck.

It is another object of the present invention to provide a chuck that minimizes radial as well as axial stress during operation.

It is another object of the present invention to provide a keyless chuck that has a minimum number of individual components that must be assembled.

It is another object of the present invention to provide a chuck with an improved nosepiece that is both decorative and retains the front sleeve in place.

These and other objects are achieved by providing a chuck for use with a manual or power driver having a rotatable drive shaft, the chuck comprising a generally cylindrical body member having a nose section and a tail section. The tail section has an axial bore formed therein to mate with the drive shaft of the driver, and the nose section has an axial bore formed therein and a plurality of angularly disposed passageways formed therethrough and intersecting the axial bore. The chuck further includes a plurality of jaws slidably positioned in each of the angularly disposed passageways, each of the jaws having a jaw face formed on one side thereof and threads formed on the opposite side thereof. The chuck further includes a nut rotatably mounted on the body and in engagement with the threads of the jaws and a bearing thrust ring fixed on the body member. The chuck further includes a self-contained anti-friction bearing assembly disposed between the nut and the thrust ring and a generally cylindrical front sleeve member in driving engagement with the nut and overlying the nose section of the body member whereby when the front sleeve member is rotated with respect to the body member, the jaws will be moved thereby.

These and other objects are also accomplished by providing a chuck for use with a manual or power driver having a rotatable drive shaft, the chuck comprising a generally cylindrical body member having a nose section and a tail section, the tail section having an axial bore formed therein to mate with the drive shaft of the driver, and the nose section having an axial bore formed therein and a plurality of angularly disposed passageways formed therethrough and intersecting the axial bore. The chuck further includes a plurality of jaws slidably positioned in each of the angularly disposed passageways, each of the jaws having a jaw face formed on one side thereof and threads formed on the opposite side thereof. The chuck further includes a nut rotatably mounted on the body and in engagement with the threads on the jaws, and a generally cylindrical front sleeve member overlying the nose section of the body member and in driving engagement with the nut. The chuck further includes a rust-resistant nosepiece adapted to be secured to the nose section of the body, the nosepiece maintaining the front sleeve member in driving engagement with the nut, whereby when said front sleeve member is rotated with respect to the body member, the jaws will be moved thereby.

Other objects, features and aspects of the present invention are discussed in greater detail below.

BRIEF DESCRIPTION OF THE DRAWINGS

A full and enabling disclosure of the present invention, including the best mode thereof, to one of ordinary skill in the art, is set forth more particularly in the remainder of the specification, including reference to the accompanying figures, in which.

Figure 1:
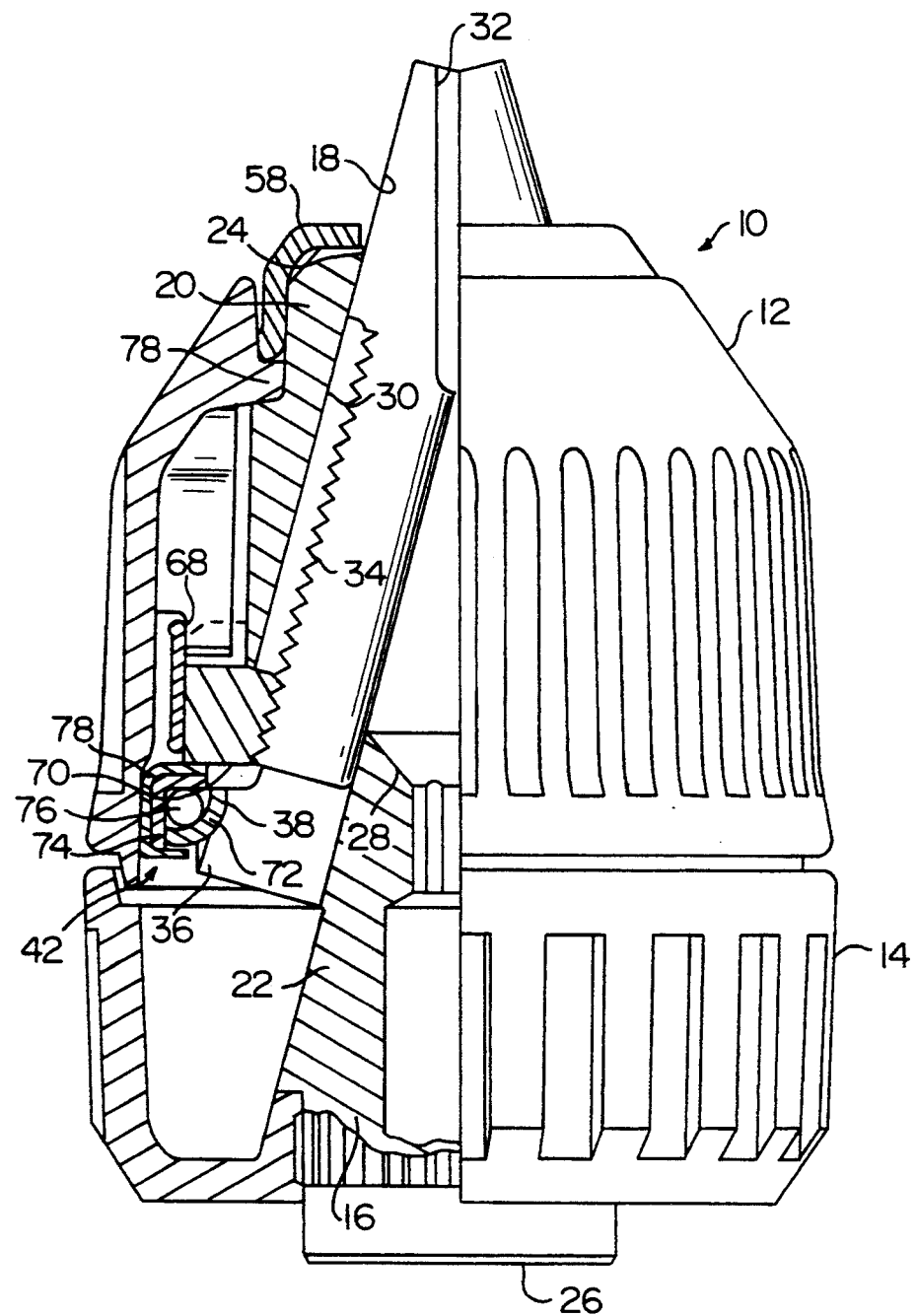
FIG. 1 is longitudinal view, partly in section, of a chuck in accordance with an embodiment of the present invention.

Repeat use of reference characters in the present specification and drawings is intended to represent same or analogous features or elements of the invention.

DETAILED DESCRIPTION OF PREFERRED EMBODIMENTS

It is to be understood by one of ordinary skill in the art that the present discussion is a description of exemplary embodiments only, and is not intended as limiting the broader aspects of the present invention, which broader aspects are embodied in the exemplary construction.

Figure 2:
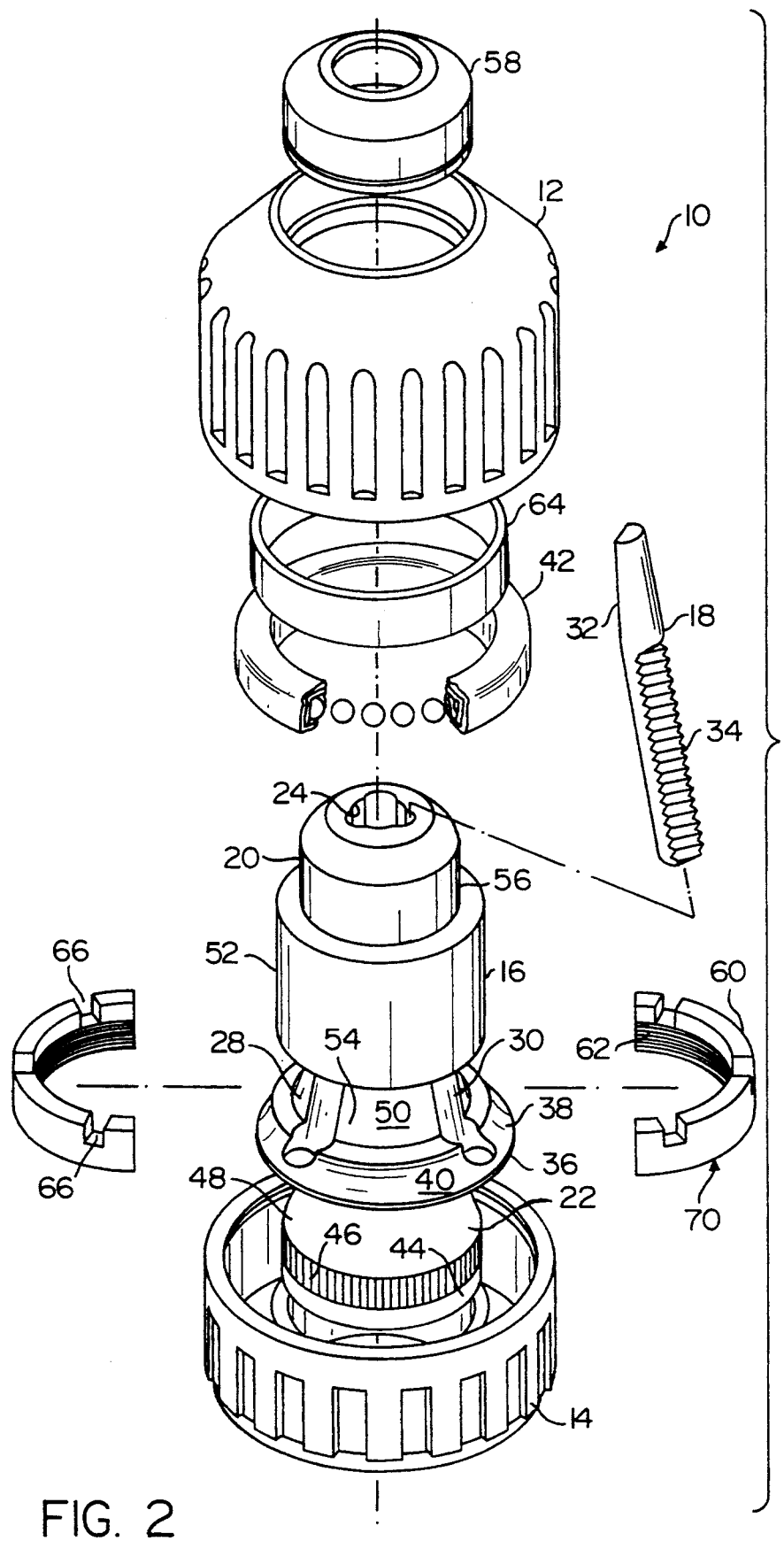
FIG. 2 is an exploded view of the chuck illustrated in FIG. 1.

Referring to FIGS. 1 and 2, a chuck 10 in accordance with the present invention is illustrated. Chuck 10 includes a front sleeve member 12, an optional rear sleeve member 14, a body member 16 and jaws 18. Body member 16 is generally cylindrical in shape and comprises a nose or forward section 20 and a tail or rearward section 22. An axial bore 24 is formed in the nose section 20 of the body member 16. Axial bore 24 is somewhat larger than the largest tool shank that the chuck is designed to accommodate. A threaded bore 26 is formed in tail section 22 of body 16 and is of a standard size to mate with the drive shaft of a powered or hand driver (not shown). The bores 24, 26 may communicate at the central region 28 of body member 16. While a threaded bore 26 is illustrated, such bore could be replaced with a tapered bore of a standard size to mate with a tapered drive shaft.

Passageways 30 are formed in body member 16 to accommodate each jaw 18. Preferably, three jaws 18 are employed and each jaw 18 is separated from the adjacent jaw by an arc of approximately 120 degrees. The axes of the passageways 30 and the jaws 18 are angled with respect to the chuck axis but intersect the chuck axis at a common point ahead of the chuck body 16. Each jaw 18 has a tool engaging face 32 which is generally parallel to the axis of the chuck body 16 and threads 34 on its opposite or outer surface. Threads 34 of any suitable type and pitch may be utilized within the scope of the present invention as would be readily apparent to one skilled in the art.

As illustrated in FIGS. 1 and 2, body member 16 includes a thrust ring member 36 which, in a preferred embodiment, is integral therewith. Thrust ring member 36 includes a thrust face 38. Thrust face 38 includes an arcuate seating surface 40 for engagement with the inner race of a self-contained anti-friction bearing assembly 42 as will be described in more detail below. Thrust ring member 36 includes a plurality of jaw guideways 50 formed around the circumference to permit retraction of the jaws 18 therethrough.

Body member 16 includes a rear cylindrical portion 44 with a knurled surface 46 thereon for receipt of optional rear sleeve 14 to be pressed thereon if so desired. Body 16 further includes a first tapered portion 48 extending from rear cylindrical portion 44 to thrust ring 36. A second tapered portion 50 extends from the area of thrust face 38 to a front cylindrical portion 52. Front cylindrical portion 52 is of greater diameter than the smaller end of second tapered portion 50 and forms a first circumferential groove 54 intermediate the nose and tail sections 20 and 22 of body 16. Body 16 further includes a reduced diameter nose portion 56 that is adapted to receive a nosepiece 58 as will be described in more detail below.

The present invention further includes a nut 60 which, in a preferred embodiment, is a split nut and which includes threads 62 for mating with threads 34 on jaws 18 whereby when said nut is rotated with respect to said body, said jaws will be advanced or retracted.

Nut 60 is adapted to receive a retaining band 64 for maintaining nut 60 together after it is assembled. In the illustrated embodiment, a split nut is utilized because of the diameter of front cylindrical portion 52. Nut 60 includes drive slots 66 for mating with drive ribs 68 on front sleeve 12 so that when front sleeve 12 is rotated, nut 60 will rotate therewith and move jaws 18 as set forth above.

A self-contained bearing assembly 42 is adapted to be placed between thrust ring 36 and a face 70 of nut 60. Self-contained bearing assembly 42 includes an inner race 72, an outer race 74 and bearing elements 76 maintained therebetween. In a preferred embodiment, bearing elements 76 are ball bearings. Self-contained bearing assembly 42 may further include a shroud 78 surrounding the inner and outer races 72, 74 for maintaining the bearing assembly as a self-contained component. Inner race 72 includes an arcuate surface that is dimensioned and configured to mate with arcuate seating surface 40 on thrust face 38 of thrust ring 36. Such mating relationship assists in alignment and minimization of both axial and radial stresses when the chuck is operated. In a preferred embodiment, self-contained bearing assembly 42 is a radial thrust bearing.

Use of a self-contained bearing assembly has a number of advantages. Assembly is greatly simplified in that individual ball bearings and cages do not have to be handled. In addition, the body and nut are not required to be as hard or dense as is necessary with conventional bearing systems where the body or nut may also serve as a thrust race, thus allowing more flexibility in materials and reducing secondary manufacturing operations and, ultimately, cost.

Front sleeve member 12 is adapted to be loosely fitted over nose section 20 of chuck 10. Drive ribs 68 of front sleeve 12 engage drive slots 66 of nut 60 so that front sleeve 12 and nut 60 will be operatively connected, i.e., when front sleeve 12 is rotated, nut 60 will rotate therewith. Front sleeve 12 includes an annular ledge portion 78 adapted to rest at the inner face of front cylindrical portion 52 and nose portion 56. Nosepiece 58 is dimensioned and adapted to be pressed onto nose portion 56 to maintain front sleeve 12 on chuck 10. It should be appreciated that nosepiece 58 could also be secured by snap fit, threading or the like. Nosepiece 58 is exposed when said chuck is assembled and is preferably coated with a non-ferrous metallic coating to prevent rust and to enhance its appearance. In a preferred embodiment, such coating may be zinc or nickel, however, it should be appreciated that any suitable coating could be utilized.

Nosepiece 58 serves to maintain front sleeve member 12 in position on chuck 10 and in driving engagement with nut 60. In addition, nosepiece 58 serves the dual purpose of providing an aesthetically pleasing cover for nose portion 56 that inhibits rust. This provides the advantage of an aesthetically pleasing appearance without the necessity to coat the entire body member 16 with a non-ferrous material. If desired, the rear sleeve member 14 may be omitted and the front sleeve member 12 extended to the tail end of body 16. This alternative is feasible when a spindle lock or the like is provided on the driver or when the driver is used to tighten or loosen the jaws.

The circumferential surface of the front sleeve member 12 may be knurled or may be provided with longitudinal ribs or other protrusions to enable the operator to grip it securely. In like manner, the circumferential surface of the rear sleeve member 14, if employed, may be knurled or ribbed if desired. The front and rear sleeves may be fabricated from a structural plastic such as polycarbonate, a filled polypropylene, for example, glass filled polypropylene, or a blend of structural plastic materials. Other composite materials such as, for example, graphite filled polymerics would also be suitable in certain environments. As will be appreciated by one skilled in the art, the materials from which the chuck of the present invention is fabricated will depend on the end use of the chuck, and the above are provided by way of example only.

It will be appreciated that rear sleeve member 14 is fixed to body member 16 while front sleeve member 12 is operatively associated with nut 36 and secured to body member 16 for relative rotation therewith. Relative movement of the front and rear sleeve members, 12 and 14, due to the interaction between threads 34 on jaws 18 and threads 62 on nut 60 causes jaws 18 to be advanced or retracted, depending upon the direction of relative movement.

While the above description is set forth with respect to a keyless chuck, it should be appreciated that the principles of the present invention are equally applicable to a keyed chuck, and such is within the scope of the present invention.

These and other modifications and variations to the present invention may be practiced by those of ordinary skill in the art, without departing from the spirit and scope of the present invention, which is more particularly set forth in the appended claims. In addition, it should be understood that aspects of the various embodiments may be interchanged both in whole or in part. Furthermore, those of ordinary skill in the art will appreciate that the foregoing description is by way of example only, and is not intended to be limitative of the invention so further described in such appended claims.

What is claimed is:

1. A chuck for use with a manual or powered driver having a rotatable drive shaft, said chuck comprising:
   a) a generally cylindrical body member having a nose section and a tail section, said tail section having an axial bore formed therein to mate with said drive shaft of said driver and said nose section having an axial bore formed therein and a plurality of angularly disposed passageways formed therethrough and intersecting said axial bore;
   b) a plurality of jaws slidably positioned in each of said angularly disposed passageways, each of said jaws having a jaw face formed on one side thereof and threads formed on the opposite side thereof;
   c) a nut rotatably mounted on said body and in engagement with said threads on said jaws;
   d) a bearing thrust ring fixed on said body member;
   e) a self-contained anti-friction bearing assembly disposed between said nut and thrust ring, said bearing assembly hving an inner race, an outer race and bearing elements cooperating together; and
   f) a generally cylindrical front sleeve member in driving engagement with said nut and overlying said nose section of said body member whereb y when said front sleeve member is rotated with respect to said body member, said jaws will be moved thereby.

2. A chuck for use with a manual or powered driver as stated in claim 1, wherein said body member includes a first circumferential groove formed therein intermediate said nose and tail sections, and wherein said nut is mounted in said circumferential groove.

3. A chuck for use with a manual or powered driver as stated in claim 2, wherein said nut is split.

4. A chuck for use with a manual or powered driver as stated in claim 1, wherein said bearing elements are ball bearings.

5. A chuck for use with a manual or powered driver as stated in claim 1, wherein said thrust ring is unitary with the body member.

6. A chuck for use with a manual or powered driver as stated in claim 1, wherein said nut includes drive slots for receipt of drive ribs on the front sleeve member.

7. A chuck for use with a manual or powered driver having a rotatable drive shaft, said chuck comprising:
   a) a generally cylindrical body member having a nose section and a tail section, said tail section having an axial bore formed therein to mate with said drive shaft of said driver and said nose section having an axial bore formed therein and a plurality of angularly disposed passageways formed therethrough and intersecting said axial bore;
   b) a plurality of jaws slidably positioned in each of said angularly disposed passageways, each of said jaws having a jaw face formed on one side thereof and threads formed on the opposite side thereof;
   c) a nut rotatably mounted on said body and in engagement with said threads on said jaws;
   d) a bearing thrust ring fixed on said body member;
   e) a self-contained anti-friction bearing assembly disposed between said nut and thrust ring, said self-contained bearing assembly including an inner race and an outer race with bearing elements maintained therebetween, said bearing assembly further including a shroud maintaining the bearing assembly together; and
   f) a generally cylindrical front sleeve member in driving engagement with said nut and overlying said nose section of said body member whereby when said front sleeve member is rotated with respect to said body member, said jaws will be moved thereby.

8. A chuck for use with a manual or powered driver having a rotatable drive shaft, said chuck comprising:
   a) a generally cylindrical body member having a nose section and a tail section, said tail section having an axial bore formed therein to mate with said drive shaft of said driver and said nose section having an axial bore formed therein and a plurality of angularly disposed passageways formed therethrough and intersecting said axial bore;
   b) plurality of jaws slidably positioned in each of said angularly disposed passageways each of said jaws having a jaw face formed on one side thereof and threads formed on the opposite side thereof;
   c) a nut rotatably mounted on said body and in engagement with said threads on said jaws;
   d) a bearing thrust ring fixed on said body member, said bearing thrust ring including an arcuate seating surface;
   e) a self-contained anti-friction bearing assembly disposed between said nut and thrust ring, said self-contained bearing assembly including an inner race and an outer race with bearing elements maintained therebetween, said inner race of said bearing assembly having an arcuate portion mating with said arcuate seating surface of said bearing thrust ring; and f) a generally cylindrical front sleeve member in driving engagement with said nut and overlying said nose section of said body member whereby when said front sleeve member is rotated with respect to said body member, said jaws will be moved thereby.

9. A chuck for use with a manual or powered driver having a rotatable drive shaft, said chuck comprising:
   a) a generally cylindrical body member having a nose section and a tail section said tail section having an axial bore formed therein to mate with said drive shaft of said driver and said nose section having an axial bore formed therein and a plurality of angularly disposed passageways formed therethrough and intersecting said axial bore;
   b) a plurality of jaws slidably positioned in each of said angularly disposed passageways, each of said jaws having a jaw face formed on one side thereof and threads formed on the opposite side thereof;
   c) nut rotatably mounted on said body and in engagement with said threads on said jaws;
   d) a bearing thrust ring fixed on said body member;
   e) a self-contained anti-friction bearing assembly disposed between said nut and thrust ring, wherein said bearing assembly is a radial thrust bearing; and
   f) a generally cylindrical front sleeve member in driving engagement with said nut and overlying said nose section of said body member whereby when said front sleeve member is rotated with respect to said body member, said jaws will be moved thereby.

10. A chuck for use with a manual or powered driver having a rotatable drive shaft, said chuck comprising:
    a) a generally cylindrical body member having a nose section and a tail section, said tail section having an axial bore formed therein to mate with said drive shaft of said driver and said nose section having an axial bore formed therein and a plurality of angularly disposed passageways formed therethrough and intersecting said axial bore;
    b) a plurality of jaws slidably positioned in each of said angularly disposed passageways, each of said jaws having a jaw face formed on one side thereof and threads formed on the opposite side thereof;
    c) a nut rotatably mounted on said body and in engagement with said threads on said jaws;
    d) a bearing thrust ring fixed on said body member;
    e) a self-contained anti-friction bearing assembly disposed between said nut and thrust ring; and
    f) a generally cylindrical front sleeve member in driving engagement with said nut and overlying said nose section of said body member whereby when said front sleeve member is rotated with respect to said body member, said jaws will be moved thereby, wherein said front sleeve member is maintained on said body member and in engagement with said nut by a rust resistant nosepiece that is pressed onto said nose section of said body member.

11. A chuck for use with a manual or powered driver having a rotatable drive shaft, said chuck comprising:
    a) a generally cylindrical body member having a nose section and a tail section, said tail section having an axial bore formed therein to mate with said drive shaft of said driver and said nose section having an axial bore formed therein and a plurality of angularly disposed passageways formed therethrough and intersecting said axial bore, said body member further including a first circumferential groove formed therein intermediate said nose and tail sections and a bearing thrust ring intermediate said circumferential groove and said tail section;
    b) a plurality of jaws slidably positioned in each of said angularly disposed passageways, each of said jaws having a jaw face formed on one side thereof and threads formed on the opposite side thereof;
    c) a split nut rotatably mounted on said body in said circumferential groove and in engagement with said threads on said jaws;
    d) a self-contained anti-friction bearing assembly disposed between said nut and thrust ring, said bearing assembly including an inner race and an outer race with bearing elements maintained therebetween and a shroud maintaining the assembly together; and
    e) a generally cylindrical front sleeve member in driving engagement with said nut and overlying said nose section of said body member whereby when said front sleeve member is rotated with respect to said body member, said jaws will be moved thereby.

12. A chuck for use with a manual or powered driver as stated in claim 11, wherein said bearing thrust ring includes an arcuate seating surface for mating with an arcuate portion of the inner race of the bearing assembly.

13. A chuck for use with a manual or powered driver as stated in claim 11, wherein said bearing assembly is a radial thrust bearing.

14. A chuck for use with a manual or powered driver as stated in claim 11, wherein said nut includes drive slots for receipt of drive ribs on the front sleeve member.

15. A chuck for use with a manual or powered driver as stated in claim 11, wherein said front sleeve member is maintained on said body member and in engagement with said nut by a rust resistant nosepiece.

16. A chuck for use with a manual or powered driver as stated in claim 11, wherein said chuck includes a rear sleeve received on said tail section.

17. An improved body member for a chuck for use with a manual or power driver having a rotatable drive shaft, said body member including:
    a) a nose section and a tail section, said tail section having an axial bore formed therein to mate with the drive shaft of said driver and said nose section having an axial bore formed therein and a plurality of angularly disposed passageways formed therethrough and intersecting said axial bore; and
    b) a bearing thrust ring disposed between said nose section and said tail section and including a arcuate seating surface for mating with an arcuate portion of a bearing assembly.

18. An improved body member for a chuck for use with a manual or power driver as stated in claim 17 and further including a first circumferential groove formed therein intermediate said thrust ring and said nose section for receipt of a nut therein.

19. An improved body member for a chuck for use with a manual or power driver as stated in claim 17, wherein said plurality of angularly disposed passageways also intersect said thrust ring.

20. An improved body member for a chuck for use with a manual or power driver as stated in claim 17, wherein said nose section is adapted to receive a front sleeve thereover.

21. An improved body member for a chuck for use with a manual or power driver as stated in claim 20, wherein said tail section is adapted to receive a rear sleeve thereover.

22. A chuck for use with a manual or powered driver having a rotatable drive shaft, said chuck comprising:
   a) a generally cylindrical body member having a nose section and a tail section, said tail section having an axial bore formed therein to mate with said drive shaft of said driver and said nose section having an axial bore formed therein and a plurality of angularly disposed passageways formed therethrough and intersecting said axial bore;
   b) a plurality of jaws slidably positioned in each of said angularly disposed passageways, each of said jaws having a jaw face formed on one side thereof and threads formed on the opposite side thereof;
   c) a nut rotatably mounted on said body and in engagement with said threads on said jaws;
   d) a generally cylindrical front sleeve member overlying said nose section of said body member and in driving engagement with said nut; and
   e) a rust resistant nosepiece adapted to be secured to said nose section of said body, said nosepiece maintaining said front sleeve member in driving engagement with said nut, whereby when said front sleeve member is rotated with respect to said body member, said jaws will be moved thereby.

23. A chuck for use with a manual or powered driver as stated in claim 22, wherein said nosepiece is exposed.

24. A chuck for use with a manual or powered driver as stated in claim 22, wherein said nosepiece is coated with a non-ferrous metallic coating.

25. A chuck for use with a manual or powered driver as stated in claim 22, wherein said nut includes drive slots and said front sleeve member includes drive ribs for mating with said drive slots.

26. A chuck for use with a manual or powered driver as stated in claim 22, wherein said nose section of said body includes a ledge portion and said nosepiece maintains a portion of said front sleeve member between said ledge portion and said nosepiece.

27. A chuck for use with a manual or powered driver as stated in claim 22, wherein said body member includes a first circumferential groove formed therein intermediate said nose and tail sections, and wherein said nut is mounted in said groove.

28. A chuck for use with a manual or powered driver as stated in claim 27 and wherein said body member includes a bearing thrust ring.

29. A chuck for use with a manual or powered driver as stated in claim 28 and further including a self-contained anti-friction bearing assembly disposed between said nut and said bearing assembly.

30. A chuck for use with a manual or powered driver having a rotatable drive shaft, said chuck comprising:
   a) a generally cylindrical body member having a nose section and a tail section, said tail section having an axial bore formed therein to mate with said drive shaft of said driver and said nose section having an axial bore formed therein and a plurality of angularly disposed passageways formed therethrough and intersecting said axial bore;
   b) a plurality of jaws slidably positioned in each of said angularly disposed passageways, each of said jaws having a jaw face formed on one side thereof and threads formed on the opposite side thereof;
   c) a bearing thrust ring fixed on said body member;
   d) a self-contained anti-friction bearing assembly having an inner race, an outer race and a plurality of bearing elements cooperating together, said inner race supported for rotation by said bearing thrust ring;
   e) a nut in engagement with said threads on said jaws, said nut supported for rotation by said outer race; and
   f) a generally cylindrical front sleeve member in driving engagement with said nut and overlying said nose section of said body member whereby when said front sleeve member is rotated with respect to said body member, said jaws will be moved thereby.

31. A chuck for use with a manual or powered driver as stated in claim 30, wherein said nut is supported for rotation by said outer race through a shroud maintaining the bearing assembly together.

* * * * *